US007421811B2

(12) United States Patent
Chen et al.

(10) Patent No.: US 7,421,811 B2
(45) Date of Patent: Sep. 9, 2008

(54) COMBINATION FRAME FOR FIXING DISPLAY PANEL MODULE

(75) Inventors: Yen-Chung Chen, Taoyuan (TW); Chen-Sheng Chung, Chungli (TW)

(73) Assignee: Quanta Computer Inc., Tao Yuan Shien (TW)

( * ) Notice: Subject to any disclaimer, the term of this patent is extended or adjusted under 35 U.S.C. 154(b) by 270 days.

(21) Appl. No.: 11/108,819

(22) Filed: Apr. 19, 2005

(65) Prior Publication Data

US 2006/0059751 A1 Mar. 23, 2006

(30) Foreign Application Priority Data

Sep. 21, 2004 (TW) ............................... 93128621 A

(51) Int. Cl.
*G02F 1/1333* (2006.01)
(52) U.S. Cl. ......................... 40/741; 348/825; 361/681; 349/58
(58) Field of Classification Search .................. 40/741, 40/739, 777, 606.13; 348/818, 819, 820, 348/821; 361/681, 682, 382; 248/917–919; 349/58–60

See application file for complete search history.

(56) References Cited

U.S. PATENT DOCUMENTS

| 1,583,720 | A | * | 5/1926 | Clay | 40/618 |
| 4,024,659 | A | * | 5/1977 | Ingerdahl | 40/741 |
| 6,055,757 | A | * | 5/2000 | Carlsson | 40/790 |
| 6,392,723 | B1 | * | 5/2002 | Sugiyama et al. | 349/58 |
| 6,512,514 | B1 | * | 1/2003 | Warashina et al. | 345/206 |
| 6,865,836 | B2 | * | 3/2005 | Sachs-Lavery | 40/741 |
| 7,130,005 | B2 | * | 10/2006 | Takata et al. | 349/58 |

* cited by examiner

*Primary Examiner*—Lesley D. Morris
*Assistant Examiner*—Shin Kim
(74) *Attorney, Agent, or Firm*—Rabin & Berdo, PC

(57) ABSTRACT

A combination frame for fixing a display panel module on a display shell is described. The combination frame is constructed by two crossbeams, two vertical beams, and a plurality of coupling devices. The coupling devices adjust an interior size of the combination frame for coupling to the display panel module exactly. The combination frame utilizes adjusting members to fine-adjust an outline size of the combination frame, and further utilizes a backboard to enhance the strength of the combination frame and fix a control circuit board of the flat panel display.

11 Claims, 3 Drawing Sheets

COMBINATION FRAME FOR FIXING DISPLAY PANEL MODULE

RELATED APPLICATIONS

The present application is based on, and claims priority from, Taiwan Application Serial Number 93128621, filed Sep. 21, 2004, the disclosure of which is hereby incorporated by reference herein in its entirety.

FIELD OF THE INVENTION

The present invention generally relates to a fixing frame for fixing a display panel module on a display shell. More particular, the present invention relates to a combination frame for fixing a display panel module on a display shell.

BACKGROUND OF THE INVENTION

Due to great progress in the electronic industry and flat panel display manufacture technology, the quality of the flat panel display is enhanced and the price thereof is reduced. The flat panel display is widely applied in both displays for personal computer and televisions for watching TV programs and enjoying the multimedia entertainment. Therefore, the quantity and the size of the flat panel displays have gradually increased in the market.

A conventional 15" or 17" display panel for a personal computer has gradually been replaced with larger display panels such as the 19" or 21" display panel. In addition, the size of the flat panel display for a television is also growing quickly; for example, a 37" TFT-LCD (Thin-Film-Transistor Liquid Crystal Display) panel, and a 42" or a 63" plasma display panel are in use now.

Due to different suppliers, current display panel modules have different outline dimensions and coupling components, although the active areas thereof are the same in size. These differences result in a problem for product design and manufacturing process. For guaranteeing quality requirements, a smooth yield, and a smooth shipment of the flat panel displays, the flat panel displays are necessary to design to adapt to the display panel modules from different suppliers. The display panel modules from different suppliers must be installed in a same display shell for a same size display.

To fix the display panel module on a front bezel of the shell of the flat panel display, the flat panel display usually uses a frame to adapt the display panel module to the front bezel. Conventionally, the frame for fixing the display panel module is formed with a one-body design. Therefore, the frames are designed and manufactured with different dimensions and shapes fitting different display panel modules from different suppliers to the same front bezel.

However, due to size increase of the flat panel display, the tooling cost of the frame is therefore rapidly increased. The frames have to adapt different display panel modules from different suppliers to the same front bezel, making frame uniformity and tooling cost reductions difficult.

SUMMARY OF THE INVENTION

It is an object of the present invention to provide a combination frame to reduce the tooling cost and increase application flexibility thereof.

It is another object of the present invention to provide a combination frame utilizing various coupling devices to fix the display panel module on the frame so as to reduce the manufacturing cost of the frame.

To accomplish the above objectives, the present invention provides a combination frame for fixing a display panel module on a display shell, and generally on a front bezel of the display shell. The combination frame includes two crossbeams, two vertical beams, adjusting members, and a plurality coupling devices. The adjusting members couple the crossbeams to the vertical beams for adjusting the exterior dimension of the combination frame, and the coupling devices can adjust the interior dimension of the combination frame for precisely coupling with the display panel module.

The coupling device can be a fixing hole, a concave fixing hole, or a fixing stud. The fixing hole can be a round fixing hole or a fixing slot. The concave fixing hole can be a round concave fixing hole or a quadrilateral concave fixing hole. The adjusting member further includes an adjusting slot, for example, an oblong hole or an elliptical hole, to adjust the exterior dimension of the combination frame. The combination frame further includes a backboard in the rear of the combination frame for coupling to the crossbeams and the vertical beams. The backboard both enhances the strength of the combination frame and fixes a display control circuit board thereon.

The combination frame according to the present invention both reduces the tooling cost of the fixing frame of the display panel modules and allows the combination frame to couple precisely the display panel modules from different sources to the display shell. Accordingly, the manufacturing cost of the flat panel display can be reduced. In addition, the utility rate of the tooling can be increased, and the volume and weight of the tooling can be also reduced so as to decrease the manufacturing cost of the combination frame.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
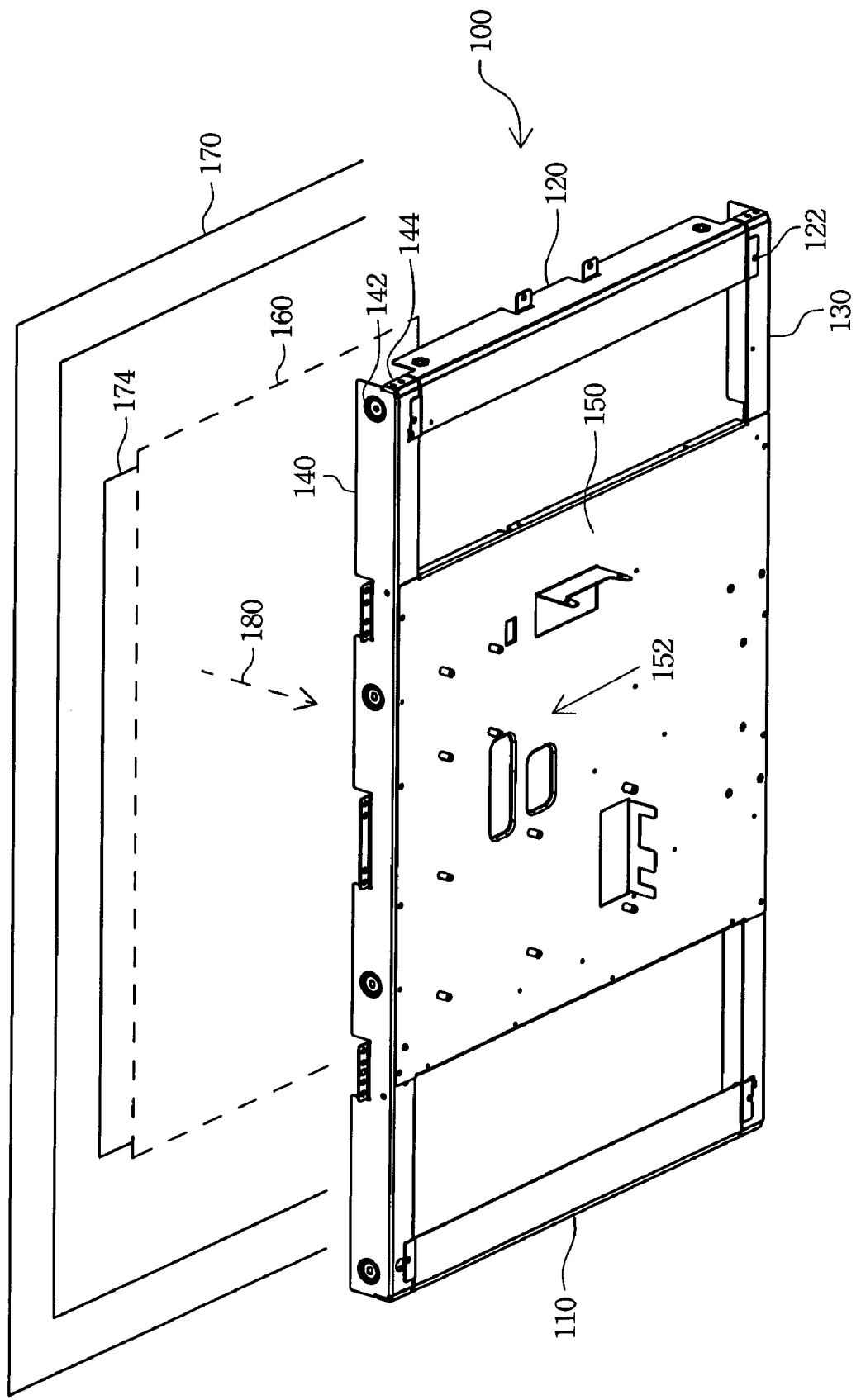
FIG. 1 is a preferred embodiment of a combination frame according to the present invention.

FIG. 1 is a preferred embodiment of a combination frame according to the present invention. Referring to FIG. 1, the combination frame 100 according to the present invention includes a first vertical beam 110, a second vertical beam 120, a first crossbeam 140, and a second crossbeam 130. The second crossbeam 130 further utilizes an adjusting member 122 to couple to the second vertical beam 120 so as to fine-tune vertically and/or horizontally the appearance dimensions of the combination frame 100. The adjusting member 122 can also be utilized to couple the second crossbeam 130 to the first vertical beam 110, and the first crossbeam 140 to the first vertical beam 110 or the second vertical beam 120

(not shown). Therefore, the combination frame 100 can fine-tune the appearance dimensions thereof according to a practical requirement. The adjusting member 122, for example, an oblong hole or an elliptical hole, can couple and adjust the vertical beam to the horizontal beam.

The first crossbeam 140 further includes a coupling device 142 to fine-tune an interior dimension of the combination frame 100 for precisely coupling various display panel modules 160 having different dimensions. Accordingly, the combination frame 100 can precisely couple to various display panel module 160 from different suppliers.

The combination frame 100 further includes a backboard 150 to enhance the total strength of the combination frame 100 and provide an area for installation of a control circuit board thereon. The backboard 150 includes a cable hole 152 to allow the signal and power cable of the display panel module 160 to pass therethrough so as to electrically connect to the circuit board installed on the backboard 150. Furthermore, two ends of the first crossbeam 140 and the second crossbeam 130 utilize composite reinforced folds 144 to enhance the strength of the crossbeams.

After the display panel module 160 is installed on the combination frame 100 along a direction 180, the combination frame 100 is coupled to the front bezel 170 along a counter direction of the direction 180. Therefore, even display panel modules 160 from different suppliers can be coupled to the front bezel 170 by way of the combination frame 100 according to the present invention. The user can therefore see images shown on the display panel module 160 through the display window 174.

Figure 2:
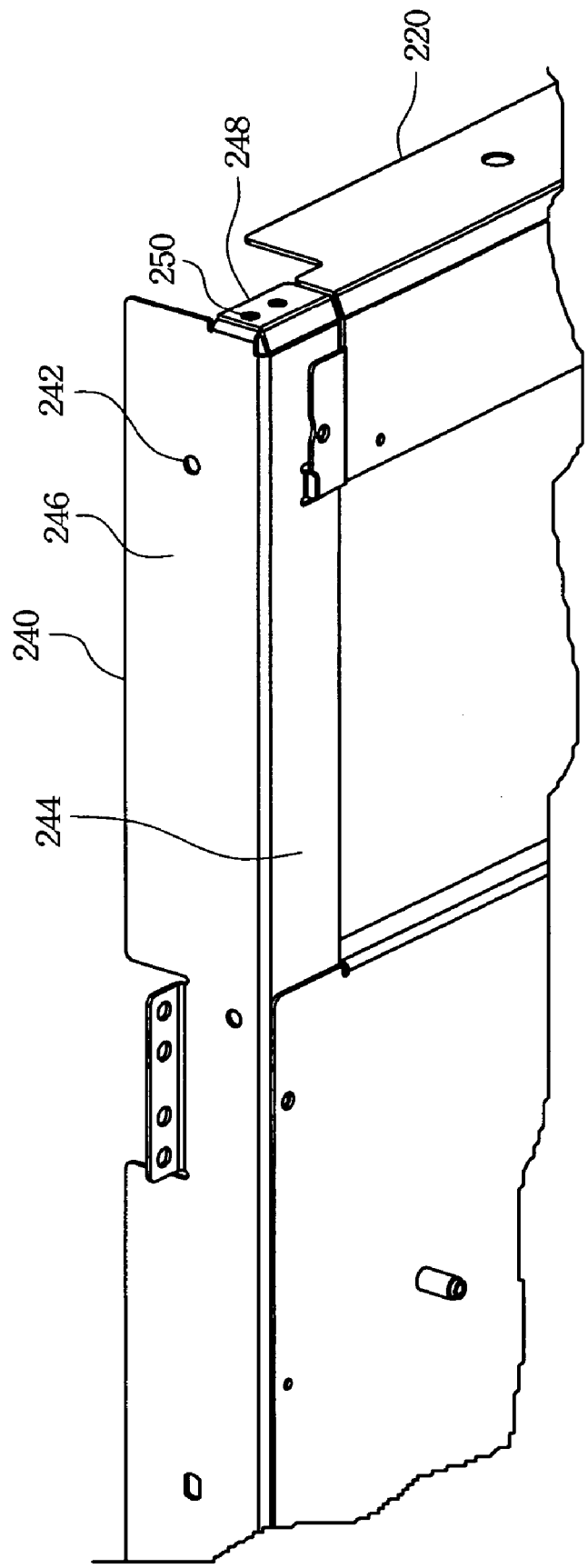
FIG. 2 is a enlarged partial view of FIG. 1.

FIG. 2 illustrates an enlarged partial view of FIG. 1. The combination frame according to the present invention utilizes the composite reinforced folds 248 to enhance the strength of the crossbeam. Two planes perpendicular to each other, a horizontal plane 246 and a vertical plane 244, of the first crossbeam 240 are further coupled together with fixing holes 250 at the end portion of the first crossbeam 240 to further enhance the strength of the first crossbeam 240. The fixing hole 250 can be coupled together by, for example, a rivet joint, a rivet joint without the rivet, or a screw joint, to enhance the strength of the first crossbeam 240.

Coupling device 242 of the first crossbeam 240 are utilized to couple to a display panel module having a similar dimension to the interior dimension of the combination frame. The display panel module is fixed on the first crossbeam 240 by inserting screws or fixing pins through the fixing hole 242 to couple to the display panel module. In addition, the coupling device 242 is used to fine-tune an interior dimension of the combination frame for precisely coupling various display panel modules having different dimensions.

Figure 3:
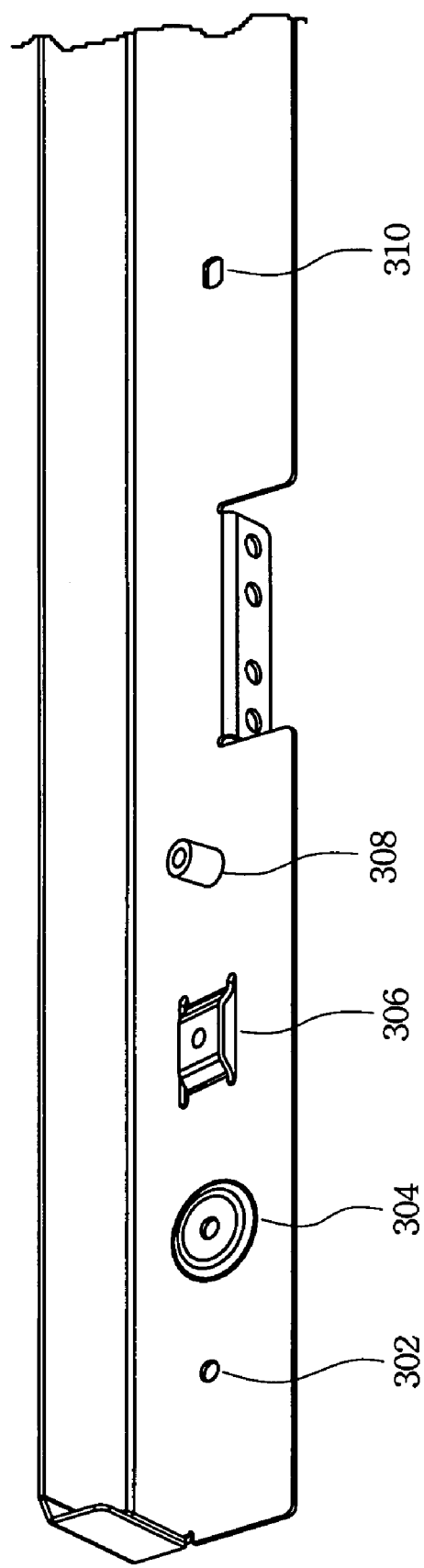
FIG. 3 illustrates some preferred embodiments of coupling devices for the combination frame according to the present invention.

FIG. 3 illustrates some preferred embodiments of coupling devices for the combination frame according to the present invention. The coupling device can be a fixing hole 302, a concave fixing hole 304, a quadrilateral concave fixing hole 306, a fixing stud 308, and/or a fixing slot 310. The fixing hole 302 and the fixing slot 310 are planar fixing holes formed on the sheet metal to fix a display panel module having a similar dimension. The fixing slot 310 further provides a lateral offset fixing function for fixing the display panel module. The concave fixing hole 304, the quadrilateral concave fixing hole 306, and the fixing stud 308 can precisely fix a display panel module having a dimension deviation. The concave fixing hole 304 of the combination frame according to the present invention can fix a display panel module having a slight dimension deviation. The quadrilateral concave fixing hole 306 can fix a display panel module having a larger dimension deviation. In addition, the fixing stud 308 can fix a display panel module having a further larger dimension deviation. The fixing slot 310 can further combine with the concave fixing hole 304, the quadrilateral concave fixing hole 306, or the fixing stud 308 to enable the concave fixing hole 304, the quadrilateral concave fixing hole 306, the fixing stud 308 to have the lateral offset fixing function.

The concave fixing hole 304 and the quadrilateral concave fixing hole 306 are preferably formed on the crossbeam or the vertical beam, directly. However, the fixing stud 308 is preferably formed with a desired dimension and then coupled to the crossbeam or the vertical beam.

With the combination frame according to the present invention, various display panel modules having different dimensions or different coupling elements can be precisely fixed on the combination frame by way of the coupling devices designed on the crossbeams or the vertical beams. Therefore, the display panel module can be safely and reliably fixed on the combination frame and then coupled to the front bezel of a display.

The first vertical beam and the second vertical beam of the combination frame can be designed symmetrically so as to be produced with the same tooling and reduce the tooling cost of the combination frame. In the same manner, the first crossbeam and the second crossbeam can also be produced symmetrically to reduce further the tooling cost thereof. The combination frame can further utilize various coupling device with different heights to fit exterior dimensions of various display panel modules from different suppliers. Accordingly, the cost of the frame for fixing the display panel module can be reduced. In addition, the combination frame can precisely fix the display panel module and the display front bezel to fix effectively the display panel module in the display shell.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A combination frame for fixing a display panel module on a front bezel, the combination frame comprising:
    two crossbeams parallel to each other;
    a plurality of coupling devices formed on the crossbeams for precisely coupling the crossbeams to the display panel module, wherein at least one of the coupling devices is a concave fixing hole having a fixing slot therein;
    two vertical beams, parallel to each other and perpendicular to the two crossbeams; and
    a plurality of adjusting members, each of the adjusting members fixing one of the two crossbeams to one of the two vertical beams for adjusting an exterior dimension of the combination frame.

2. The combination frame of claim 1, wherein the vertical beams also have the coupling devices thereon.

3. The combination frame of claim 1, wherein at least one of the coupling devices is a fixing hole, a concave fixing hole, or a fixing stud.

4. The combination frame of claim 1, wherein at least one of the coupling devices is a round fixing hole or a fixing slot.

5. The combination frame of claim 1, wherein at least one of the coupling devices is a round concave fixing hole or a quadrilateral concave fixing hole.

6. The combination frame of claim 1, wherein the adjusting member comprises an adjusting hole.

7. A combination frame for fixing a display panel module on a front bezel, the combination frame comprising:
- two crossbeams parallel to each other;
- a plurality of coupling devices formed on the crossbeams for precisely coupling the crossbeams to the display panel module;
- two vertical beams, parallel to each other and perpendicular to the two crossbeams; and
- a plurality of adjusting members, each of the adjusting members fixing one of the two crossbeams to one of the two vertical beams for adjusting an exterior dimension of the combination frame, wherein at least one of the adjusting members is an adjusting hole having an adjusting slot.

8. A flat panel display, comprising:
- a display panel module;
- a display control circuit board;
- a display shell;
- a combination frame for coupling the display panel module to the display shell, the combination frame further comprising:
- two crossbeams parallel to each other;
- a plurality of coupling devices formed on the crossbeams for precisely coupling the crossbeams to the display panel module;
- two vertical beams, parallel to each other and perpendicular to the two crossbeam;
- a backboard coupling to the vertical beams and the crossbeams for fixing a display control circuit board; and
- a plurality of adjusting members, each of the adjusting members fixing one of the two crossbeams to one of the two vertical beams for adjusting an exterior dimension of the combination frame.

9. The combination frame of claim 8, wherein the display shell comprises a front bezel.

10. The combination frame of claim 8, wherein at least one of the coupling devices is a round fixing hole, a fixing slot, a round concave fixing hole, a quadrilateral concave fixing hole, or a fixing stud.

11. The combination frame of claim 8, wherein at least one of the coupling devices is a round concave fixing hole, a quadrilateral concave fixing hole, or fixing stud concave fixing hole, having a fixing slot therein.

* * * * *